United States Patent Office 3,459,682
Patented Aug. 5, 1969

3,459,682
MIXED OXIDE OF THORIUM AND URANIUM
MONOPHASED OXYDATION CATALYST
René Bressat, Villeurbanne, Alain De Calmes, Fontenay-aux-Roses, and Bernard Claudel and Yves Trambouze, Villeurbanne, France, assignors to Commissariat á l'Energie Atomique
Filed Dec. 6, 1965, Ser. No. 511,818
Claims priority, application France, Dec. 8, 1964, 997,835; Jan. 8, 1965, 1,219
Int. Cl. B01j 11/50, 11/22, 11/32
U.S. Cl. 252—469                                    7 Claims

ABSTRACT OF THE DISCLOSURE

A highly reactive monophased oxidation catalyst is a mixed oxide of thorium and uranium. The process for making this catalyst, includes heating a complex oxalate or mixed oxalate of uranium and thorium up to a decomposition temperature ranging from about 400° C. to about 500° C.

---

This invention relates to catalysts favoring the combustion of gases and more particularly, though not exclusively, the combustion of the exhaust gases of internal engines, furnaces, etc.

The invention is also concerned with the methods for preparing these catalysts.

The object of the invention is to produce a catalyst consisting of mixed oxides of uranium under its 4th valence state and of thorium having a much greater activity than the known catalysts using either one of said elements.

Another object of the invention is to enable the insertion of uranium in the stable lattice of thoria by substituting atoms of thorium by atoms of uranium in any atomic proportion, however not exceeding 35%, irrespectice of the average oxidation state of the uranium.

A further object of the invention is to provide a catalyst readily suitable for use for favoring the post-combustion of exhaust gases of internal combustion engines, steam engines, etc.

Figure 1:
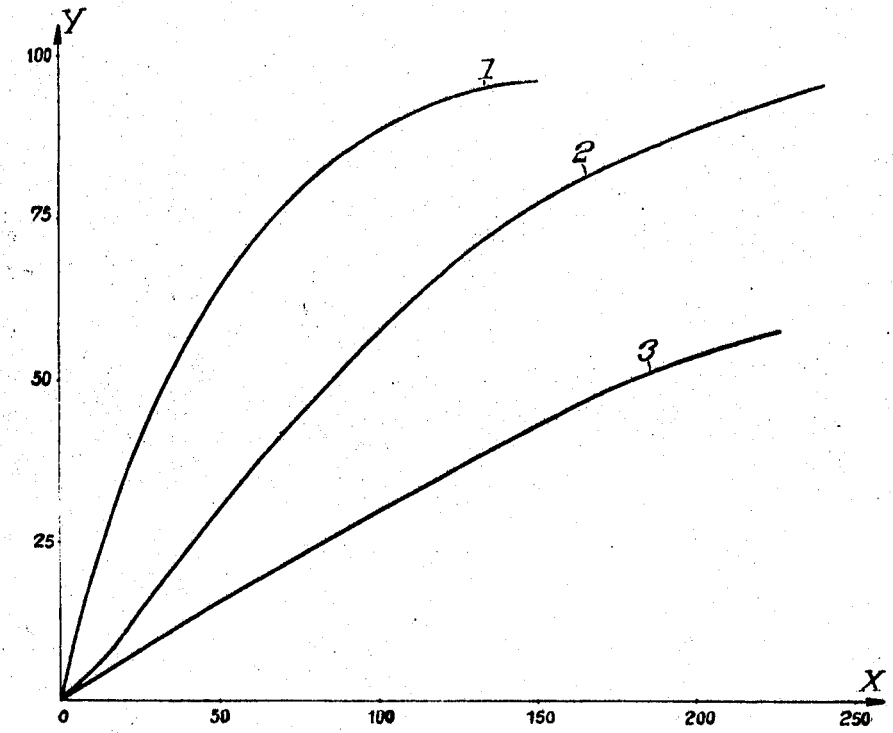
Figure 2:
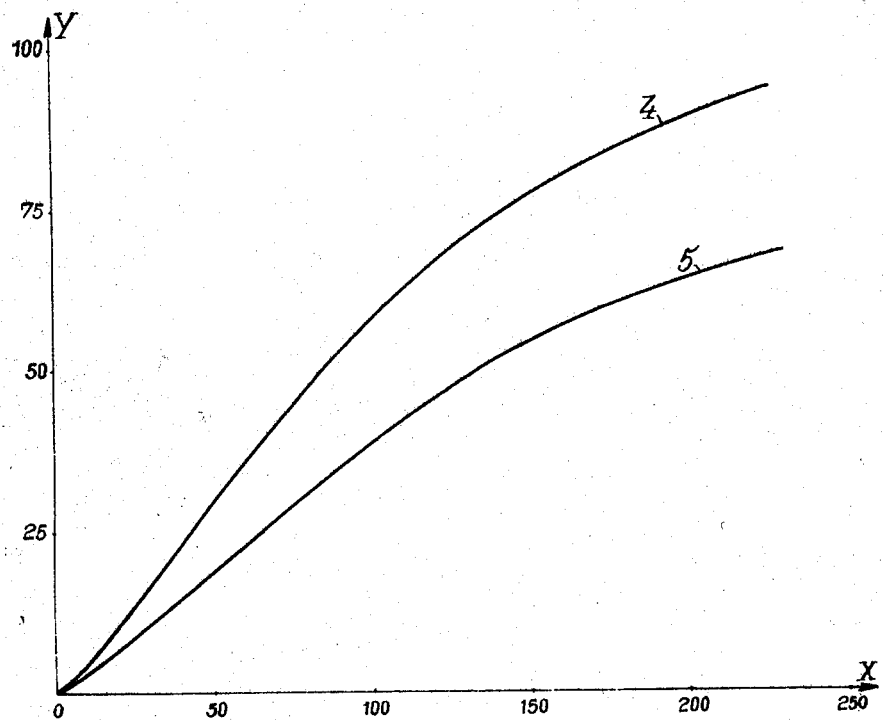
Figure 3:
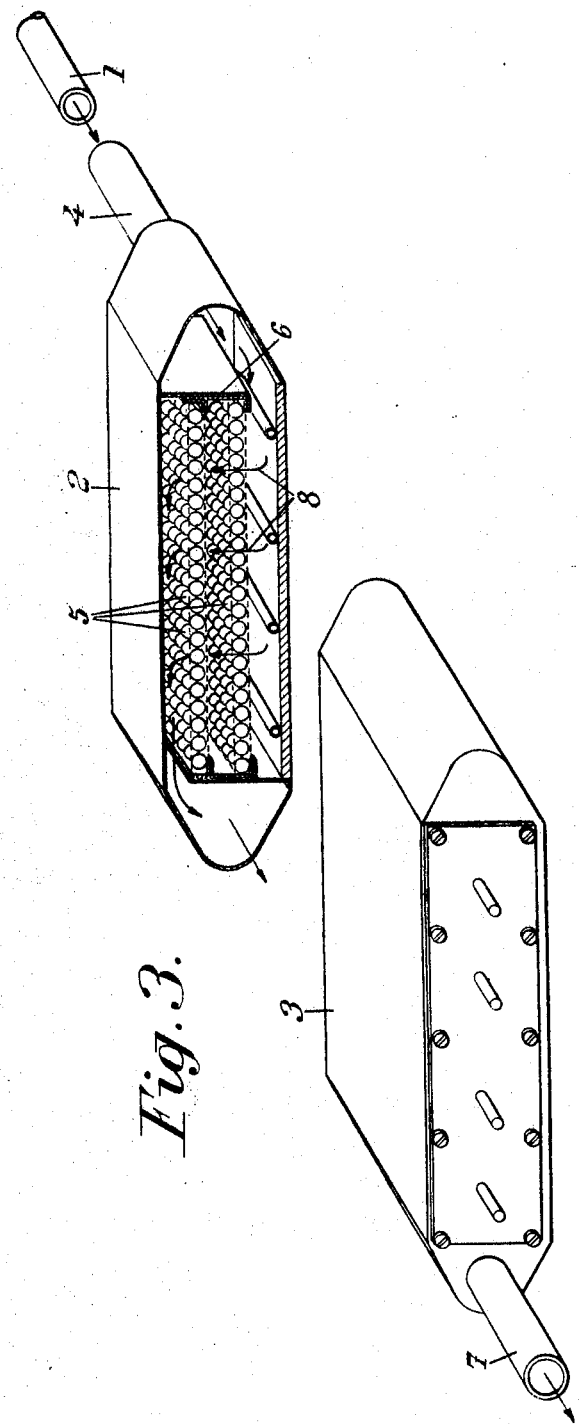

Other objects of the invention will appear as the description thereof proceeds in conjunction with the drawings in which:

FIGS. 1 and 2 illustrate the influence, on the oxidation of carbon monoxide, of several of the new catalysts obtained by the new process according to the invention, compared among themselves or with known catalysts containing thoria, and FIG. 3 shows a perspective view with transverse section of a suitable device enabling the use of the catalyst for completing the combustion, for instance of the uncompletely burned exhaust gases of an internal engine.

Concerning the catalysts themselves, the invention consists in monophased mixed oxides of thorium and uranium whose formula is:

$$U_xTh_{1-x}O_{2+y}$$

in which $x$ is lower than 0.35 and $y$ ranges between 0 and 0.3, such monophased oxides presenting, on the one hand, substantially the crystalline cubic structure with centered faces of thoria in which atoms of thoria have been substantially replaced by atoms of uranium and, on the other hand, a specific surface ranging from about 20 to about 30 square-meters per gram;

Concerning the methods for preparing these catalysts, the invention consists in, first, forming either a complex oxalate of general formula $$(NH_4)_2[U_xTh_{1-x}(C_2O_4)_3] \cdot nH_2O$$

in which $x$ has already the value it should have in the final mixed oxides desired and $n$ is an integer, or a mixed oxalate whose formula is $$U_xTh_{1-x}(C_2O_4)_2 \cdot nH_2O$$

in which $x$ and $n$ have the same meanings as above and, second, in decomposing under the ambient atmosphere and at a temperature ranging from about 400° to about 5000 C. said complex oxalate or mixed oxalate, this decomposition being preferably performed by raising the temperature gradually and linearly within a period of time of about three hours, up to the final decomposition temperature, for instance 500° C., and then by maintaining the product under this temperature for about 20 hours.

The invention consists further, concerning more particularly the formation of the mixed oxalate of thorium and uranium, in controlling the composition of the mixed oxalate precipitated in the reaction of a solution having a pH 0 and constituted with a nitrate of uranium under its 4th valence state and a thorium nitrate, taken in the ratio desired in the final mixed oxalate (such ratio corresponding to the number of the uranium atoms divided by the sum of the uranium and thorium atoms in the mesh of the lattice), with a solution containing oxalate ions in that said reaction is performed by adding solutions of uranium IV ions and thorium ions to a solution containing a great excess of oxalic ions, preferably to a concentrated or saturated oxalic acid solution.

Concerning now the mixed oxides according to the invention, they exhibit a remarkable activity for favoring the combustion of hydrocarbons and more particularly of carbon monoxide. This renders them particularly suitable for favoring the completion of the combustion of the exhaust gases of internal engines or other engines.

It has been observed, in the catalyst obtained according to the process of the invention and when the proportions of the atoms of uranium with respect to the sum of the atoms of uranium and thorium in the lattice does not exceed 35%, that the catalytic mixed oxide exhibit a rigorously monophased structure, the crystalline parameter ranging from about 5.55 A. to about 5.59 A., the variations of this parameter being substantially dependent on the proportions of the interstitial oxygen atoms which modify more or less the size of the anionic lattice mesh of the mixed oxide, whereas the cationic lattice remains substantially constant. It has been further observed through electronic diffraction that the structure within the core of the crystal is preserved with the same parameters on its external surface.

This structure remains stable during the use of the catalyst, for instance for favoring the post-combustion of exhaust gases, thus enabling the possibility of taking advantage of the catalytic properties of the uranium oxide which otherwise is, especially when taken alone, difficult to use owing to the fact that its composition as well as its structure, hence its catalytic activity are likely to be subjected to changes dependent upon factors such as temperature, the partial pressure of oxygen etc. in the atmosphere with which it is brought in contact.

Concerning now the mixed oxalate or the complex oxalate constituting the starting compounds in the performance of the process according to the invention, they can be prepared as follows.

The complex oxalate can be prepared by adding a mixture of uranium oxalate and thorium oxalate, both hexa-hydrated, to a heated solution of ammonium oxalate and under a stream of nitrogen. After the complete dissolution of said uranium and thorium oxalates, the clear solution is concentrated to a third of its original volume, whereby, after cooling, a mixture of complex oxalate and of ammonium oxalate separates by crystallization. The anhydrous complex salt of thorium and uranium can be obtained, for instance, by removal of the ammonium oxalate through a fractionated sublimation at a temperature of about 150° C. and under a pressure of 0.1 mm. of mercury.

For instance the complex oxalate the formula of which is $$[U_{0.30}Th_{0.70}(C_2O_4)_3](NH_4)_2$$

has been prepared by adding a mixture of 30 g. of uranium oxalate and 70 g. of thorium oxalate, with hexahydrated, to a solution of 90 g. of ammonium oxalate in 500 ml. of water and by recovering the crystals in the above stated conditions.

Concerning now the above mixed oxalates of uranium and thorium they can be precipitated from solutions having a pH zero of uranium IV and thorium nitrate, by the addition thereto of a solution containing oxalic ions.

It must be noted however that, even though this last method for preparing the mixed oxalate gives in any case monophased compounds, the composition thereof is not uniform throughout each crystal obtained, in particular when passing from the core to the periphery of the crystal. Further, the composition of the precipitated mixed oxalate varies dependent upon the fact whether the precipitate is separated immediately from the mother liquor or, on the contrary, is left in contact with these mother liquors for a certain time.

This is well evidenced by the following experience where it is desired to prepare an oxalate having the formula $$U_xTh_{1-x}(C_2O_4)_2 \cdot nOH_2$$

in which $x$ equals 0.5 by adding increasing amounts of oxalic acid to 10 identical solutions of thorium nitrate and uranium IV nitrate (the cationic ratio being equal to the one desired in the mixed oxalate desired). As evidenced in the Table 1 herebelow. The values of $x$ in the solid effectively obtained depend upon the theoretical quantities of oxalic acid added.

It has been observed that, when carrying out this method, the mixed oxalate obtained possesses immediately the desired ratio of uranium with respect to thorium ($x=0.5$ in the above example) and that this composition does not vary anymore, in particular dependent upon the time of contact between the precipitate and the mother liquors.

It must be added also that the radio-crystallographic analysis shows that a product having a well organized crystalline lattice is obtained.

Numerous mixed oxides of thorium and uranium have been obtained starting from the mixed or complex oxalate, according to anyone of the processes which have been envisaged here above, for instance the mixed oxides exhibiting the following characteristics tabulated herebelow have been obtained by the thermolysis of the corresponding mixed oxalates.

$$U_xTh_{1-x}O_{2+y}$$

| Value of $x$ | Value of $y$ | Specific surface in m²/g. | Crystalline parameter | Color |
|---|---|---|---|---|
| 0 | | 29 | 5.59 | |
| 0.01 | | 25 | 5.59 | |
| 0.03 | | 25 | | |
| 0.05 | | 25 | | |
| 0.07 | | 21 | | |
| 0.10 | 0.07 | 21 | 5.58 | Light brown. |
| 0.28 | 0.26 | | 5.56 | Brown. |
| 0.29 | 0.26 | | 5.58 | Dark brown. |
| 0.30 | | 20 | 5.55 | |

The catalytic action of mixed oxides according to the present invention with respect to the oxidation of carbon monoxide is remarkable as evidenced by the curves in FIGS. 1 and 2 which enables the comparison between the catalytic activity of a certain number of mixed oxides of uranium and thorium, obtained by the above mentioned processes, either among themselves or with catalysts consisting essentially in pure thoria containing, if the case should be, minor amounts of a promotor such

| Oxalate samples | 1 | 2 | 3 | 4 | 5 | 6 | 7 | 8 | 9 | 10 |
|---|---|---|---|---|---|---|---|---|---|---|
| Proportions of oxalic acid added with respect to the required theoretical stoichiometric quantity | 1/10 | 2/10 | 3/10 | 4/10 | 5/10 | 6/10 | 7/10 | 8/10 | 9/10 | 10/10 |
| Value of $x$ in the precipitate of mixed oxalate after 6 hours of contact with the mother-liquor | 0.7 | 0.69 | 0.64 | 0.61 | 0.60 | 0.55 | 0.56 | 0.52 | 0.50 | 0.49 |
| Value of $x$ in the precipitate of mixed oxalate immediately after the precipitation | No precipitates | | 0.68 | 0.69 | 0.68 | 0.63 | 0.63 | 0.62 | 0.58 | 0.55 |

This table shows that the concentration in uranium decreases from the core to the periphery of the crystal, the composition of the precipitate becoming closer to the composition of the solution when it is left in contact with the mother liquor. Further the radiocrystallographic analysis of the final product shows that its lattice is quite disorganized.

These departures of the composition obtained from the theoretical composition desired might be due either to differences in the solubility of the starting nitrates, in the balance state, or to differences in the kinetics of cationic precipitations, such factors being dependent upon the respective concentrations in the ions $$U^{+4}, Th^{+4} \text{ and } C_2O_4^{-2}$$

Such drawbacks are however overcome when, according to the invention, the solutions of thorium and uranium IV ions are reacted with a solution containing a great excess of oxalic ions, as compared with the respective concentrations in uranium and thorium compounds.

According to a preferred embodiment of the invention the solutions of uranium and thorium ions, advantageously solutions of uranium and thorium nitrates are added to a concentrated or saturated solution of oxalic ions, advantageously of oxalic acid.

In such manner the concentration of oxalic ions in the solution remains substantially constant during the precipitation of the insoluble oxalate.

as cerium oxide obtained by the thermolysis of the corresponding nitrates.

The curves in FIG. 1 represents more precisely the reaction rate (expressed in percent and recorded on the axis Y) depending upon the time (expressed in minutes and recorded on the axis X) of a mixture of carbon monoxide and oxygen, the proportions of which in the mixture are 1 mole of CO for 2 moles of $O_2$, which has been introduced in a reaction vessel at a temperature of 344° C. and under an original pressure of 204 mm. of mercury in the presence of catalysts constituted by:

(1) the mixed oxide $U_{0.277}Th_{0.723}O_{2.20}$ (curve 1)
(2) the mixed oxide $U_{0.0092}Th_{0.9908}O_{200564}$ (curve 2) (these two oxides having been prepared by thermolysing the corresponding mixed oxalates);
(3) pure thoria obtained by the calcination of the corresponding oxalate.

These curves permit to appreciate that the catalysts according to the invention (curves 1 and 2) are far more efficient than the thoria alone. For instance after a reaction period of 150 minutes, the oxydation of CO is almost complete (93%) in the presence of the first mixed oxide (curve 1) and reaches 78% in the presence of the second mixed oxide (curve 2), whereas the rate of transformation of CO in the presence of thorine alone is only of 43% in the presence of thorine alone.

Concerning FIG. 2 it shows the superiority of the catalytic activity of a mixed oxide according to the invention, in which $x$ equal 0.009 (i.e., a mixed oxide which contains 0.9% of uranium), obtained by thermolysis in the corresponding mixed oxalate (curve 4), to the activities of a catalyst containing a substantially equivalent percentage of uranium, namely 0.72%, and which has been obtained by the thermolysis of a mixture of thorium nitrate and uranium nitrate under otherwise identical conditions (curve 5). For instance after a time of reaction of 200 minutes, the rate of transformation of CO in the presence of the mixed oxide (curve 4) is almost complete (90%) whereas in the presence of the catalyst obtained by thermolysis of a mixture of uranium and thorium nitrates the transformation rate is not more than 65%.

The following examples complete these illustrations of the advantages of the catalysts according of the invention.

EXAMPLE I 1.5 g. of mixed oxide $U_{0.10}Th_{0.90}O_{2.07}$ have been placed in an experimental reaction vessel and are heated under vacuum during 12 h. at a temperature of 450°, prior to the admission into said vessel of a gaseous mixture of a carbon monoxide and of oxygen in stoichiometric proportions corresponding to the reaction $CO + \frac{1}{2}O_2 \rightarrow CO_2$, under a temperature of 353° C. and a pressure of 210 mm. of mercury. The time of half reaction (transformation rate of CO=50%) is measured and compared to the time of half reaction of a catalyst consisting essentially of thoria prepared by thermolysis of thorium nitrate and contacted with a mixture $CO+O_2$ in otherwise identical conditions, in order to bring in evidence the high catalytic activity of the mixed oxide according to the invention.

The evolution of the reaction is followed through a manometer and further by means of an air liquid trap which captures the carbonic gas $CO_2$ formed during this reaction. The time of half reaction for obtaining mixed oxide $U_{0.10}Th_{0.90}O_{2.07}$ equals 48', instead of 72' for the thorine alone.

EXAMPLE II 1.5 g. of the mixed oxide $U_{0.28}Th_{0.72}O_{2.26}$ are heated under vacuum in the above vessel during 12 hours and under a temperature of 450° C., prior to the admission in said vessel of a mixture of oxygen and carbon monoxide in the same stoichiometric proportions under a temperature of 353° C. and a pressure of 184 mm. of memory.

The times of half reaction measured in the presence, on the one hand, of mixed oxide and, on the other hand, of thoria containing minor amounts of cerium oxide (about 1% of cerium with respenct to the thorine) are of 42' for the mixed oxide instead of 93' for the thoria containing minor amounts of cerium acting as a promotor.

Here again the comparison of these half reaction periods leads to the conclusion that the catalyst obtained by the decomposition of mixed or complex oxalates of uranium IV and thorium according to the invention exhibit a far greater efficiency than the former known catalysts.

Concerning finally the practical use of the new catalysts it can be achieved by impregnated an inner support, constituted for instance by elements formed with asbestos, alumina or any refractory material, with an ammonical solution of the mixed or complex oxalate and by causing the decomposition of these oxalates in situ under the above described conditions.

The support elements containing the catalyst may then be used in a so called post-combustion device which may be shaped, for instance as shown in FIG. 3, in order to be positioned within the exhaust pipe 1 of an internal combustion engine.

Under these conditions the temperature of the exhaust gases escaping from the engine will be sufficient to cause the starting of the oxidation reaction.

FIG. 3 shows in a sectional perspective two portions 2 and 3 of a post-combustion device within the exhaust gases, arriving through pipe 1 and entering the portion 2 through a duct 4, are driven through the catalyst supports as shown by the arrows 8, these supports consisting of small balls 5 positioned within two superposed stages and carried by gratings 6 within device 2. The exhaust gases finally escape from the portion 3 through a pipe 7.

Of course input ducts may be provided too in said device for enriching the gaseous mixture within said device with air in order to favor the complete oxidation reaction.

Finally it is also possible to envisage to directly impregnate certain portions of the combustion chambers or nozzles of jet engines by forming thereon a porous support or lining containing the catalyst; in the same manner it is possible to form the same porous support direclty on the interior walls of the car mufflers.

For instance an interior lining can be obtained on the interior portions of said mufflers by projecting thereon a porous material, such as alumina, by means of a plasma torch, this support being subsequently impregnated with the mixed oxalate solutions and subjected to heat in view of the formation in situ of the catalyst under the above mentioned conditions.

In such a manner very efficient post-combustion devices are obtained.

In a general manner, while the above description discloses what is deemed to be practical and efficient embodiments of the present invention, said invention is not limited thereto as there might be changes made in the steps of the process without departing from the principle of the invention as comprehended within the scope of the appended claims.

What is claimed is:

1. A process of manufacturing a highly reactive oxydation catalyst consisting of a mixed oxide of thorium and of uranium whose formula is

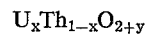

$$U_xTh_{1-x}O_{2+y}$$

in which $x$ is smaller than 0.35 and $y$ ranges from 0 to 0.3 which comprises, in a first step, dissolving in an aqueous ammonium oxalate solution a mixture of uranium oxalate and thorium oxalate in an atomic ratio of uranium with respect to the sum of the uranium and thorium atoms which equals $x$, and recovering a complex oxalate of uranium and thorium from said solution and, in a second step, heating said complex oxalate at a decomposition temperature ranging from about 400° C. to about 500° C.

2. A process according to claim 1 wherein the heating of said complex oxalate, in said second step, consists in raising linearly the tempearture up to said decomposition temperature within a period of time of about three hours and maintaining the heated products at such tempearture for about twenty hours.

3. A process according to claim 1 wherein the recovery of the complex oxalate comprises concentrating the solution obtained to precipitate a product and subsequently subjecting said product to a sublimation under reduced pressure at a temperature of about 150° C.

4. A process of manufacturing a highly reactive oxidation catalyst consisting of a mixed oxide of thorium and of uranium whose formula is

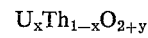

$$U_xTh_{1-x}O_{2+y}$$

in which $x$ is smaller than 0.35 and $y$ ranges from 0 to 0.3 which comprises, in a first step, reacting a mixture of soluble salts containing uranium ions and thorium ions in a corresponding $x$ ratio of uranium and thorium, with a solution containing oxalic ions to precipitate a mixed oxalate of thorium and uranium, recovering the mixed oxalate and heating said mixed oxalate at a decomposition temperature ranging from about 400° C. to about 500° C.

5. A process according to claim 4 wherein the heating of said mixed oxalate, in said second step, consists in raising linearly the temperature up to said decomposition temperature within a period of time of about three hours and maintaining the heated products at such temperature for about twenty hours.

6. A process according to claim 4 wherein the precipitation of said mixed oxalate, during said first step, is performed by adding a mixture of soluble salts of uranium and of thorium, taken in an atomic ratio of uranium with respect to the sum of uranium and thorium atoms which equals $x$, in an aqueous solution containing oxalic ions in an excess with respect to the theoretical stoichiometric quantity required such that the concentration in oxalic ions of the solution remains substantially constant during precipitation.

7. A process according to claim 6 wherein said precipitation is performed by adding a mixture of uranium nitrate and of thorium nitrate in an excess of a solution of concentrated oxalic acid.

References Cited

UNITED STATES PATENTS

| | | | |
|---|---|---|---|
| 2,261,159 | 11/1941 | Huppke | 252—459 |
| 3,214,238 | 10/1965 | Rombau et al. | 252—462 |

FOREIGN PATENTS

| | | |
|---|---|---|
| 1,358,557 | 3/1964 | France. |

DANIEL E. WYMAN, Primary Examiner

P. E. KONOPKA, Assistant Examiner

U.S. Cl. X.R.

23—2, 288, 315; 252—461, 462, 465, 477; 301—1